(12) United States Patent
Ranc et al.

(10) Patent No.: US 12,330,245 B2
(45) Date of Patent: Jun. 17, 2025

(54) WELDING TORCH AND CORRESPONDING MANUFACTURING METHOD

(71) Applicant: FRAMATOME, Courbevoie (FR)

(72) Inventors: Maximilien Ranc, Laives (FR); Alain Petit, Varennes le Grand (FR); Hervé Nicolas, Chalon sur Saone (FR)

(73) Assignee: FRAMATOME, Courbevoie (FR)

( * ) Notice: Subject to any disclaimer, the term of this patent is extended or adjusted under 35 U.S.C. 154(b) by 931 days.

(21) Appl. No.: 17/299,159

(22) PCT Filed: Dec. 3, 2019

(86) PCT No.: PCT/EP2019/083472
§ 371 (c)(1),
(2) Date: Jun. 2, 2021

(87) PCT Pub. No.: WO2020/115033
PCT Pub. Date: Jun. 11, 2020

(65) Prior Publication Data
US 2022/0072643 A1  Mar. 10, 2022

(30) Foreign Application Priority Data
Dec. 5, 2018 (FR) .................................. 18 72355

(51) Int. Cl.
*B23K 9/028* (2006.01)
*B22F 5/10* (2006.01)
(Continued)

(52) U.S. Cl.
CPC ............ *B23K 9/0284* (2013.01); *B22F 5/106* (2013.01); *B23K 9/167* (2013.01); *B23K 9/173* (2013.01);
(Continued)

(58) Field of Classification Search
CPC ...... B23K 9/0284; B23K 9/167; B23K 9/173; B23K 9/296; B23K 9/32; B33Y 80/00; B22F 2999/00
See application file for complete search history.

(56) References Cited

U.S. PATENT DOCUMENTS

| 4,532,406 A   | * | 7/1985 | Povlick  | B23K 9/167 219/136 |
| 2016/0074973 A1 | * | 3/2016 | Kachline | B23K 9/173 219/74  |

(Continued)

FOREIGN PATENT DOCUMENTS

| JP | H0314074 U   | 2/1991 |
| WO | WO9601717 A1 | 1/1996 |

OTHER PUBLICATIONS

Corresponding Search Report for PCT/EP2019/083472.
Corresponding Search Report for FR1872355.

*Primary Examiner* — Brian W Jennison
(74) *Attorney, Agent, or Firm* — Davidson Kappel LLC

(57) ABSTRACT

A welding torch includes a head (3) having a body (11) bearing an electrode (13); an electric power source (27); and a filler metal wire (17) and a wire guide (19) guiding the filler metal wire (17) to the electrode (13). The body (11) is obtained by additive manufacturing from an electrically conductive metal, and the electrode (13) is electrically connected to the electric power source (27) by the metal constituting the body (11). The wire guide (19) includes an insulating sheath (29) inside which the filler metal wire (17) moves, and the filler metal wire (17) is electrically insulated from the potential of the body (11) by the insulating sheath (29).

16 Claims, 8 Drawing Sheets

(51) Int. Cl.
*B23K 9/167* (2006.01)
*B23K 9/173* (2006.01)
*B23K 9/29* (2006.01)
*B23K 9/32* (2006.01)
*B33Y 80/00* (2015.01)

(52) U.S. Cl.
CPC ............... *B23K 9/296* (2013.01); *B23K 9/32* (2013.01); *B22F 2999/00* (2013.01); *B33Y 80/00* (2014.12)

(56) References Cited

U.S. PATENT DOCUMENTS

2018/0079024 A1* 3/2018 Hsu .................. B23K 9/125
2018/0354060 A1* 12/2018 Sigl .................. B23K 9/295

* cited by examiner

WELDING TORCH AND CORRESPONDING MANUFACTURING METHOD

The present disclosure relates to welding torches.

BACKGROUND

Repair operations by welding in the nuclear industry, or more generally on heavy equipment and pressure vessels, require in certain cases the use of welding torches with complex geometries (not straight). These torches must be miniaturized to allow access to the area to be repaired.

The welding torches are traditionally manufactured by assembling parts made of different materials (brass, stainless steel, copper, ceramic). These parts are obtained for example by machining. They are assembled by methods such as screwing, welding, brazing, etc.

Such manufacturing methods are expensive.

The miniaturization options are limited, especially when it is necessary to integrate multiple functions: cooling, protective gas supply, instrumentation, remote vision, etc.

SUMMARY

In this context, the present disclosure aims to provide a welding torch that does not have the above disadvantages.

To this end, a welding torch is provided comprising:
a head, having a body bearing an electrode;
a power supply, having an electric power source;
a filler metal wire and a wire guide, guiding the filler metal wire to the electrode
the body being obtained by additive manufacturing from an electrically conductive metal, the electrode being electrically connected to the electric power source by the metal constituting the body;
the wire guide comprising an insulating sheath inside which the filler metal wire moves, the filler metal wire being electrically insulated from the potential of the body by the insulating sheath.

Welding torch manufacturing by additive manufacturing, that is, by three-dimensional printing, enables complex shaped welding heads adapted to each situation to be obtained. This type of manufacturing is inexpensive.

In the case of the implementation of the gas-shielded electric arc method with filler metal, the torch body must integrate at least the functions of the electric current, the protective gas and filler metal wire passage, while being very compact. In particular, the passage of the electric current can be done through the material constituting the torch body, so that it is not necessary to provide a specific circuit for the passage of the current.

The wire guide for the filler metal wire can thus be integrated into the welding head due to the presence of the insulating sheath. This contributes to the compactness of the torch.

In particular, it can protrude from the torch body towards the electrode tip to enable the filler metal wire to come close to the electrode tip.

The welding torch may also have one or more of the following features, considered individually or in any technically possible combination:

the welding torch comprises a carrier integral with the head, the carrier being obtained by additive manufacturing from an electrically conductive metal, the electrode being electrically connected to the electric power source by the metal constituting the carrier, the filler metal wire being electrically insulated from the potential of the carrier by the insulating sheath;

the welding torch comprises a base obtained by additive manufacturing from an electrically conductive metal, the electrode being electrically connected to the electric power source by the metal constituting the base, the carrier being integral with the base;

the welding torch comprises a base obtained by additive manufacturing from an electrically conductive metal, the electrode being electrically connected to the electric power source by the metal constituting the base, the head being integral with the base;

the body comprises an inner cavity in which the filler metal wire and the insulating sheath pass;

the wire guide comprises a ceramic tip fixed to the body in the extension of the inner cavity;

the wire guide comprises a tube located entirely outside the head, through which the filler wire and the insulating sheath pass;

the torch comprises a protective gas supply, the body comprising an inner cavity gas passage cavity connected fluidly to the protective gas supply;

the body comprises a protective gas diffusion opening around the electrode into which the inner protective gas passage cavity opens, the head comprising a diffusion grid extending into the diffusion opening and obtained by additive manufacturing together with the body;

the torch comprises a cooling fluid supply, the body comprising an inner cavity for the passage of the cooling fluid connected fluidically to the cooling fluid supply;

the body comprises an outer wall internally delimiting the protective inner gas passage cavity, the inner cooling fluid passage cavity being formed in the thickness of the outer wall;

the torch comprises a video observation system, the body having an inner cavity for passage of the video observation system;

the torch comprises at least one sensor carried by the body and a signal transmission cable connected to the sensor, the body having an inner cavity for passage of the signal transmission cable.

A method of manufacturing a welding torch having the above characteristics is also provided, the method comprising a manufacturing step in which the body is obtained by additive manufacturing from an electrically conductive metal.

BRIEF SUMMARY OF THE DRAWINGS

Further features and advantages of the present disclosure will be apparent from the detailed description given below, by way of indication and not in any way limiting, with reference to the appended Figures, among which.

DETAILED DESCRIPTION

The welding torch of the present disclosure is typically intended for conducting welding operations with a filler metal, in areas where the available space is reduced or in areas inaccessible to operators.

In particular, it is intended for conducting maintenance operations in the nuclear industry, for example one or more of the operations listed below:
- repairing a heating rod sleeve in the pressurizer of a pressurized water nuclear reactor (PWR);
- replacing a primary branch connection;
- any intervention requiring a repair in an environment inaccessible to man, either for accessibility or radiological reasons.

Alternatively, it is intended for interventions on heavy equipment and pressure vessels, in nuclear or non-nuclear industrial installations.

The welding torch is intended to be used in a gas shielded arc welding method of the TIG, MIG, MAG type, or any other suitable method.

Figure 1:
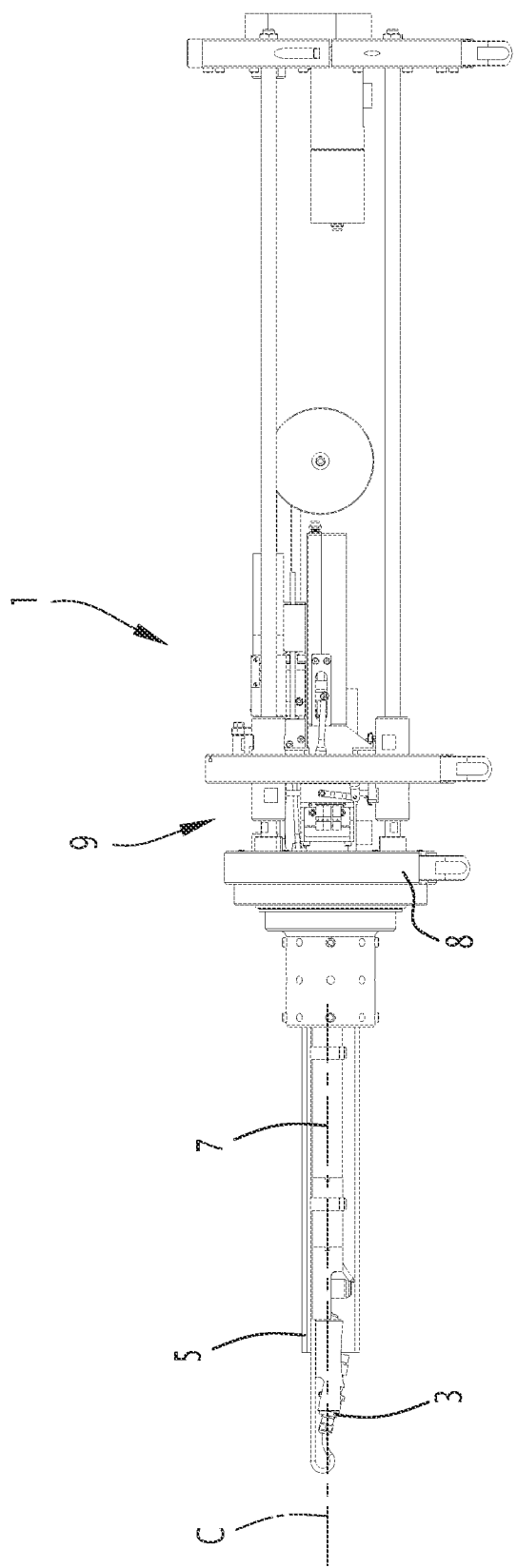
FIG. 1 is a side view of a welding torch according to the present disclosure engaged in a tube.

The welding torch 1 shown in FIG. 1, has a head 3.

This head is of reduced size and can be inserted in reduced spaces, in this case inside a duct 5.

Typically, the head 3 has a cylindrical shape, with a substantially circular section. It has a diameter of less than 50 mm, preferably less than 30 mm, even more preferably less than 20 mm.

For example, it can have a diameter of 20 mm, so as to carry out welding operations inside a pipe with a diameter of less than 50 mm.

The welding torch 1 also comprises a carrier 7 integral with the head 3.

It generally comprises a base 8, the carrier 7 being integral with the base 8.

Perpendicular to the axis of the duct, the base 8 has a much larger section than the carrier or the head. It is designed to remain outside the duct.

The base 8 ensures the mechanical connection with the support of the welding torch. It holds the carrier 7 and other equipment or mechanisms such as the fluid (gas and cooling liquid), electric current and welding wire supplies.

The carrier 7 is designed to be inserted into the duct 5 and allows the welding head 3 to be placed in the work area.

The carrier 7 has the shape of an elongated arm along a central axis C.

In FIG. 1, the axis C is parallel to the central axis of the duct 5.

The head 3 is located at one axial end of the carrier 7.

The head 3 is located at the axial end of the carrier 7 opposite the base 8.

The welding torch 1 preferably comprises a motor 9 configured to rotate the head 3 with respect to the duct 5 around a rotation axis, corresponding here to the central axis of the duct 5.

More precisely, the motor 9 is configured to rotate the head 3, the carrier 7 and the base 8.

This motor controls the angular displacement as well as the displacement speed during welding.

Other motors allow for the positioning of the torch 1 in the part 5, axially and radially. These drives are used manually, for example, to position the head 3 as close as possible to the work area. In addition, or alternatively, these drives are controlled automatically in order to ensure, for example, regulation of the arc voltage during welding, or the oscillatory movements necessary for the welding operation.

In the example of FIG. 1, the central axis of the head 3 is not aligned with the central axis of the carrier 7.

Figure 2:
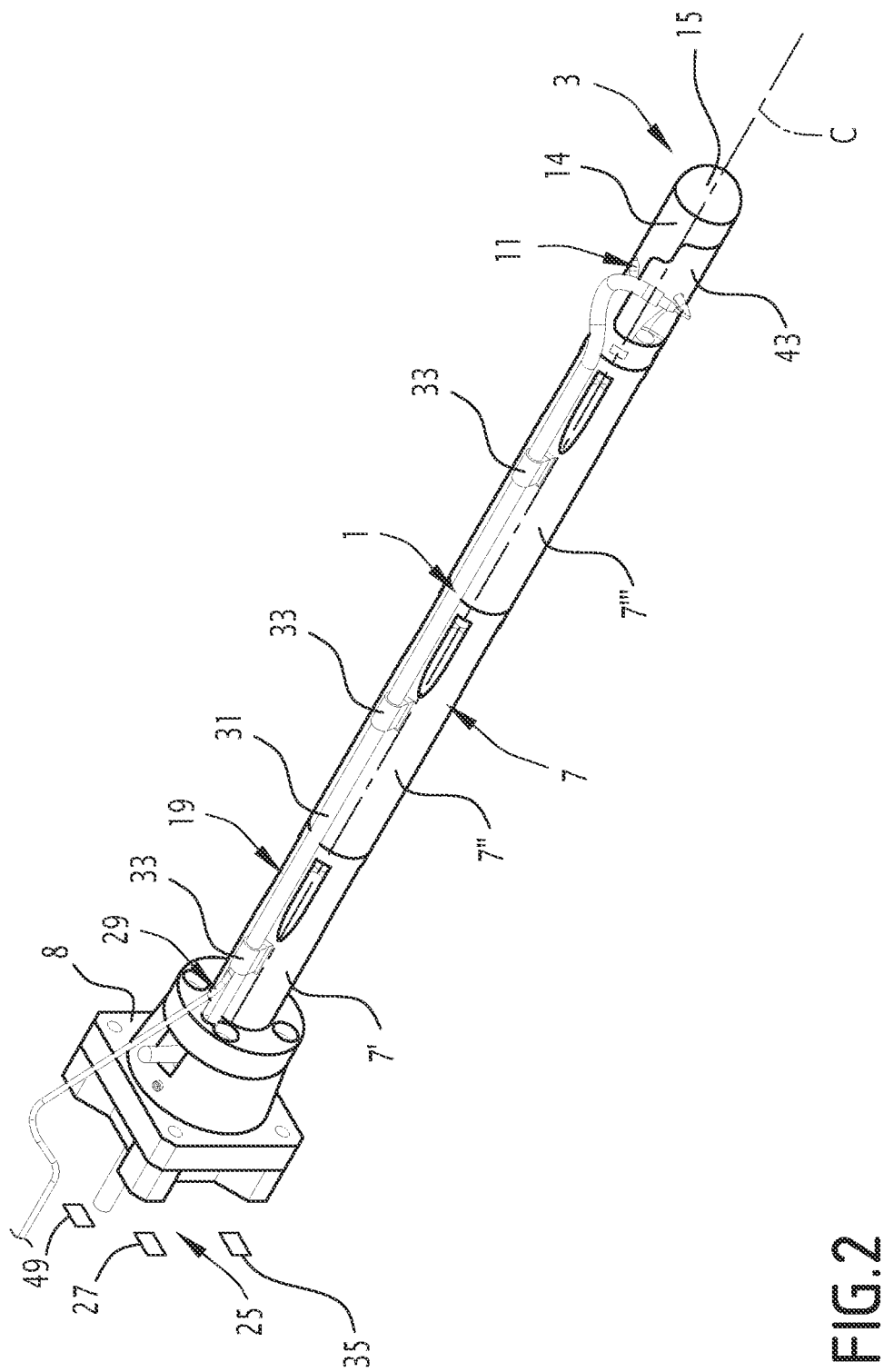
FIGS. 2 and 3 are perspective views, taken at two different angles, of a second welding torch according to the present disclosure.
Figure 3:
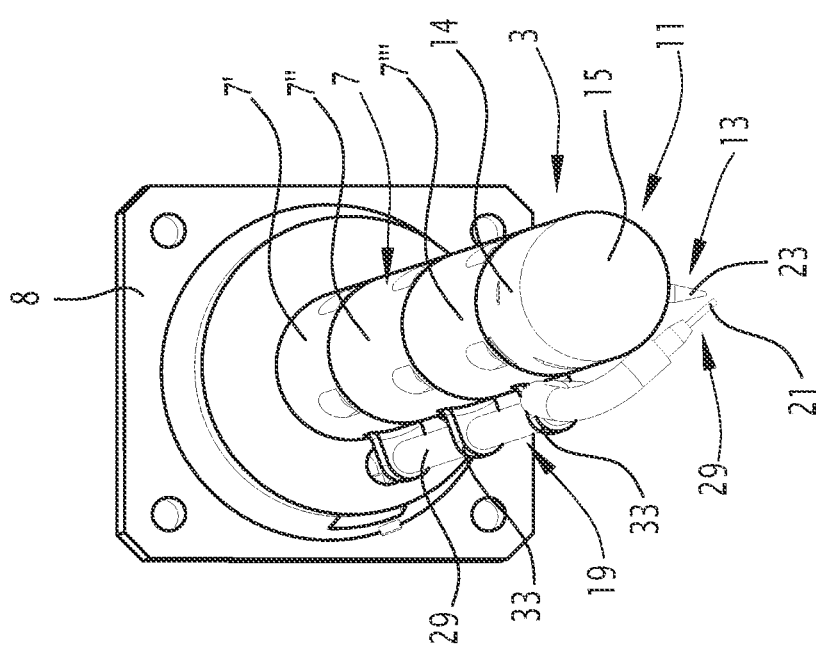

In contrast, in the example of FIGS. 2 and 3, the central axis of the head 3 is aligned with the central axis of the carrier 7.

Figure 8:
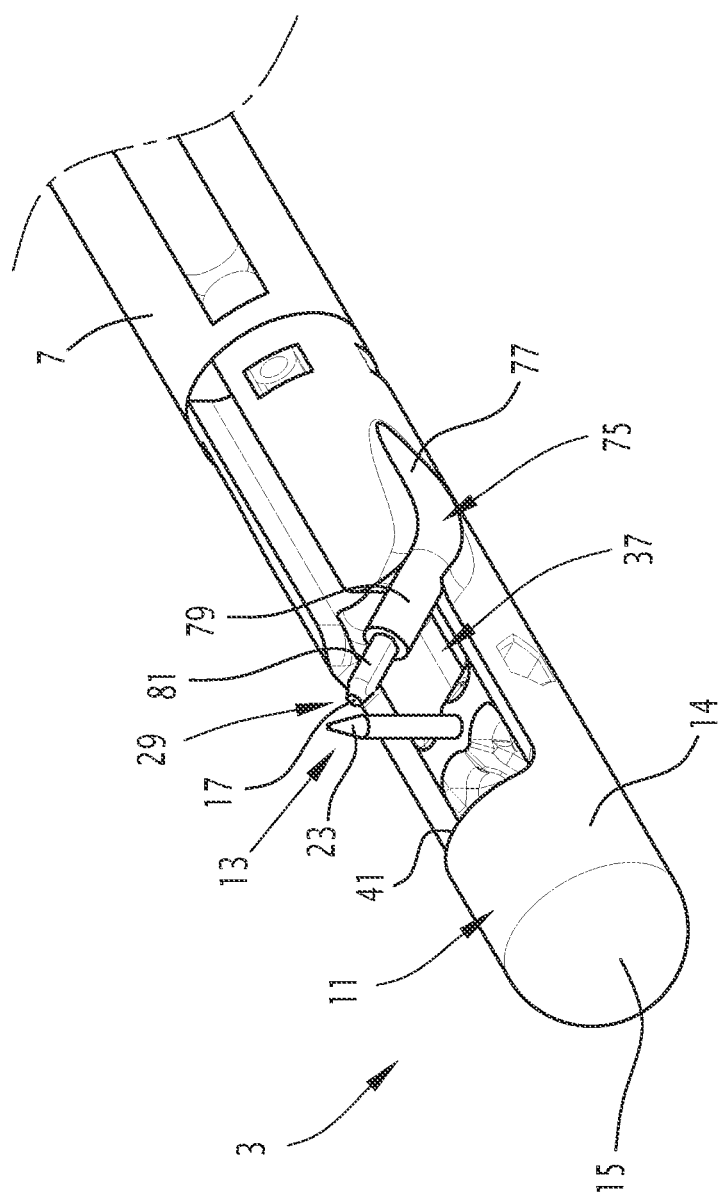
FIG. 8 is a perspective view of the head of a third welding torch of the present disclosure.

In FIGS. 3 and 8, it can be seen that the head 3 comprises a body 11 bearing an electrode 13 (in the case of implementation of the TIG welding method).

The body 11 has a generally cylindrical shape, with a cylindrical section 14 and an axial end 15 in the shape of a sphere. The electrode 13 projects radially from the torch body 11.

The torch 1 further comprises a filler metal wire 17 and a wire guide 19 guiding the filler metal wire 17 to the electrode 13.

The wire guide 19 guides the wire from a filler metal wire storage magazine to the electrode 13. It is arranged so that the free end 21 of the wire is immediately adjacent to the tip 23 of the electrode 13.

The torch 1 further comprises an electrical power supply 25, including an electrical power source 27.

Advantageously, the body 11 is obtained by additive manufacturing from an electrically conductive metal. The electrode 13 is electrically connected to the electric power source 27 through the metal constituting the body 11 of the welding torch.

Typically, the carrier 7 is also obtained by additive manufacturing from an electrically conductive metal.

In this case, the electrode 13 is electrically connected to the electric power source 27 by the metal constituting the carrier 7 of the welding torch.

The carrier 7 is for example made of several sections 7', 7", 7''' fixed to each other, three sections in the example shown.

Each section 7', 7", 7''' defines an axial portion of the carrier. The sections 7', 7", 7''' are fixed axially in line with each other.

Section 7' is mounted on the base 8, and section 7''' holds the head 3. Section 7" connects sections 7' and 7''' to each other.

The sections 7', 7", 7''' are fixed to each other by any suitable means: screwing, welding, etc.

According to an advantageous variant, the base 8 is also obtained by additive manufacturing from an electrically conductive metal.

The electrode 13 is then electrically connected to the power source 27 by the metal constituting the base 8.

The electric current is thus not supplied directly to the electrode 13 by a cable or an auxiliary conductor.

To reach the electrode 13, the electric current passes through the material constituting the elements obtained by additive manufacturing, typically the carrier 7, the torch body 11, and possibly the base 8.

The elements obtained by additive manufacturing are electrically connected to the electric power source 27 by any suitable means, for example by cables, arranged on the base of the welding torch.

The electrically conductive metal is for example a steel, an aluminum alloy, a nickel alloy or a titanium alloy.

The electrode 13 is typically made of pure tungsten (in the case of the TIG method) or doped with oxides (e.g., cerium, thorium, tantalum).

The electrical potential of the power source can be transmitted directly to the welding wire in the case of the MIG or MAG methods.

The body 11 is obtained by any suitable additive manufacturing method (laser-powder, laser-wire, etc.).

The carrier 7 and/or the base 8 are obtained, if necessary, by the same method.

Figure 4:
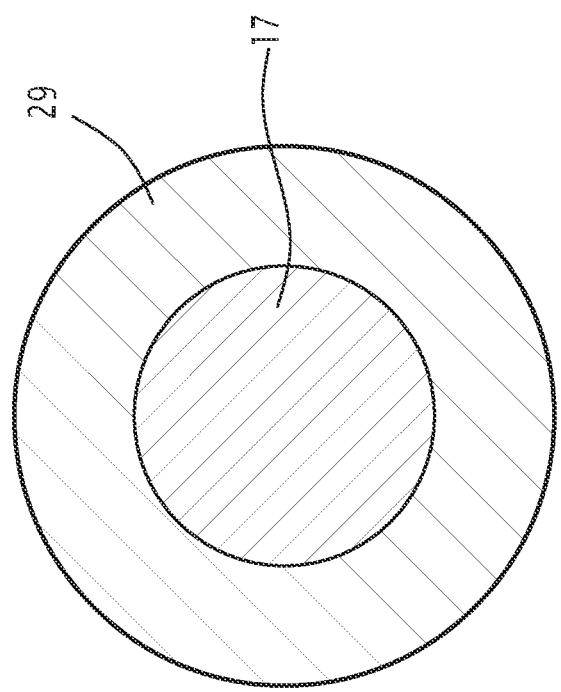
FIG. 4 is a sectional view of the insulating sheath and the filler metal wire.

The wire guide 19 advantageously comprises an insulating sheath 29, inside which the filler metal wire 17 moves (FIG. 4). The filler metal wire 17 is thus electrically insulated from the potential of the elements obtained by additive manufacturing, typically the carrier 7 and the body 11, by the insulating sheath 29.

For example, the insulating sheath 29 is made of a plastic material such as Teflon or any other suitable material.

The insulating sheath 29 typically extends from the magazine to near the electrode 13. The filler metal wire 17 is free to slide inside the insulating sheath 29 toward the electrode 13. The wire is driven by a drive member.

According to one embodiment shown in FIGS. 2 and 3, the wire guide 19 is located entirely outside the head 3.

In this case, the thread guide 19 comprises a tube 31, for example, located entirely outside the head 3.

The tube 31 is also located entirely outside the carrier 7.

This tube extends along the carrier 7, and along the head 3. It stops a short distance from the tip 23 of the electrode. It is attached to the carrier 7 by jumpers 33.

The insulating sheath 29 and the filler wire 17 run inside the tube 31.

The tube 31 is made of steel, for example.

The torch 1 also comprises a protective gas supply 35.

Advantageously, the body 11 comprises an inner protective gas passage cavity 37 fluidly connected to the protective gas supply 35. This cavity 37 is visible in FIGS. 5 through 7.

The inner protective gas passage cavity 37 is arranged directly in the material of the body 11. It has any suitable shape, even if complicated or tortuous. It is obtained in a simple and economical way because the body 11 is obtained by additive manufacturing.

Figure 6:
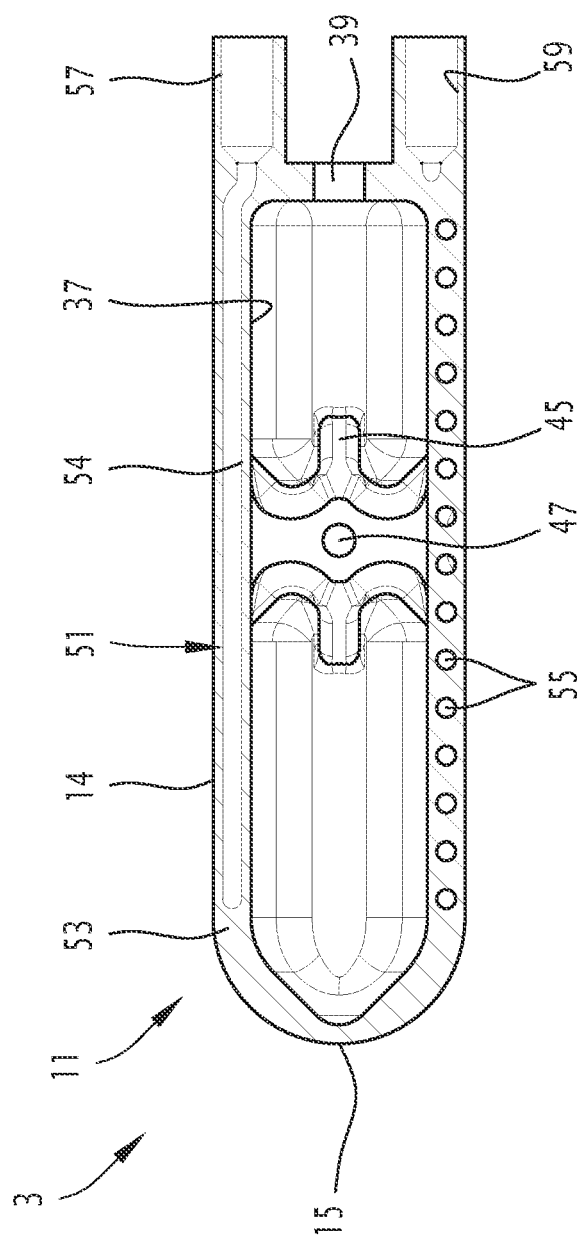
FIG. 6 is an axial cross-sectional view of the torch head of FIGS. 2 and 3, showing the inner coolant passage cavity and the inner protective gas passage cavity.

An opening 39 for supplying protective gas is provided in the body 11 (FIG. 6). It opens into the inner protective gas passage cavity 37, allowing it to be stabilized. It is connected to the protective gas supply 35 by any suitable means, for example by a duct which moves the entire length of the torch 1 from the base to the body 11, through the carrier 7.

Figure 5:
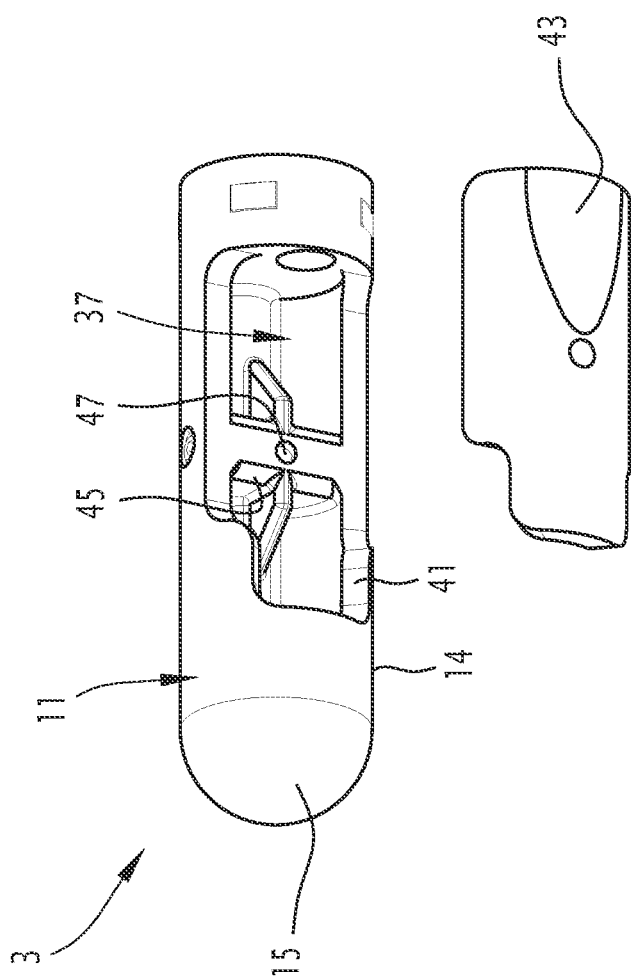
FIG. 5 is an exploded view of the welding torch head of FIGS. 2 and 3, showing the inner protective gas passage cavity and the protective gas diffusion grid.

The body 11 also has an opening 41 for diffusing the protective gas around the electrode 13, into which the inner protective gas passage cavity 37 opens (FIG. 5).

The opening 41 is, for example, provided in the cylindrical section 14. The electrode 13 passes through the diffusion opening 41.

The head 3 preferably comprises a diffusion grid 43 extending into the diffusion opening 41 and obtained by additive manufacturing together with the body 11.

The diffusion grid 43 is thus made of the same material as the body 11. It forms a single piece with the body 11. In FIG. 4, it is shown separated from the body 11 only to reveal the inner structure of the head 3.

The diffusion grid 43 is porous vis-à-vis the protective gas. It has openings for passage of the protective gas (not shown in FIG. 5), of suitable size and configuration. Preferably, these openings constitute a three-dimensional mesh. The openings are, for example, rectangular in cross-section and are arranged in a rectangular pattern.

The diffusion grid 43 occupies the entire surface of the diffusion opening 41.

It should be noted that the body 11 forms a mass 45 located across the inner cavity for the passage of the protective gas 37 (FIGS. 5 and 6). This mass 45 has an opening 47 for receiving the electrode 13, in which the electrode 13 is blocked by any suitable means, for example by cooperation of shapes. This mass also constitutes a reinforcement and contributes to the rigidity of the body 11, to compensate for the weakening caused by the cavity 37 and the perforated structure of the diffusion grid 43.

The welding head 1 comprises a cooling fluid supply 49 (FIG. 2). The body 11 comprises an inner cavity 51 for the passage of the cooling fluid, fluidly connected to the cooling fluid supply 49 (FIG. 6). This cooling fluid circulates in a closed circuit through the torch from the base to the torch body 11, through the carrier 7.

According to an alternative embodiment shown in FIG. 6, the body 11 comprises an outer wall 53 internally delimiting the inner cavity for the passage of the protective gas 37. The inner cavity for passage of the cooling fluid 51 is formed in the thickness of the outer wall 53.

This inner cavity 51 has a complex shape. It typically comprises one or more axial sections, such as the section 54 in FIG. 6, and one or more circumferential sections, such as the sections 55 shown in FIG. 6. These sections are arranged to cover the entire surface of the body 11. Its trajectory is thus substantially helical, which is made possible by the non-conventional manufacturing method.

Cooling fluid inlet and outlet ports 57, 59 are provided in the body 11 (FIG. 6).

The sections 54 and 55 form a closed circuit, fluidly connecting the inlet 57 to the outlet 59.

The inlet 57 and the outlet 59 are connected to the cooling fluid supply 49 by any suitable means, for example by ducts passing through the carrier 7.

The inner cooling fluid passage cavity 51 is thus formed directly in the material of the body 11. It is obtained in a simple and economical way because the body 11 is obtained by additive manufacturing.

Advantageously, the torch 1 comprises a video observation system 61. The body 11 comprises an inner cavity 63 for passage of the video observation system 61.

The video observation system 61 comprises, for example, an endoscope 65 extending into the inner cavity 63. The endoscope 65 preferably comprises a self-contained cooling system.

The endoscope 65 carries a diode 67 configured to provide vision when the electric arc is extinguished. The diode 67 is carried by an end of the endoscope 65 bent to point toward the tip 23 of the electrode 13, through the opening 41.

The endoscope 65 extends the full length of the torch, from the base 8 to the head 3, inside the carrier 7.

The image in this case is processed by an outer camera, located at one end of the endoscope 65 opposite the diode 67. The image is sent to a monitor to allow an operator to control the welding head.

According to another variant, the video observation system comprises a camera installed at the end of the torch body. A lighting device is then added nearby. A cable bearing the image signal extends into the inner cavity 63. It is connected by one end to the camera. It moves through the torch to its base 8, inside the carrier 7. The cable is connected to a monitor to allow an operator to control the welding head.

The inner cavity for passage of the video observation system 63 is made in the thickness of the outer wall 53.

Figure 7:
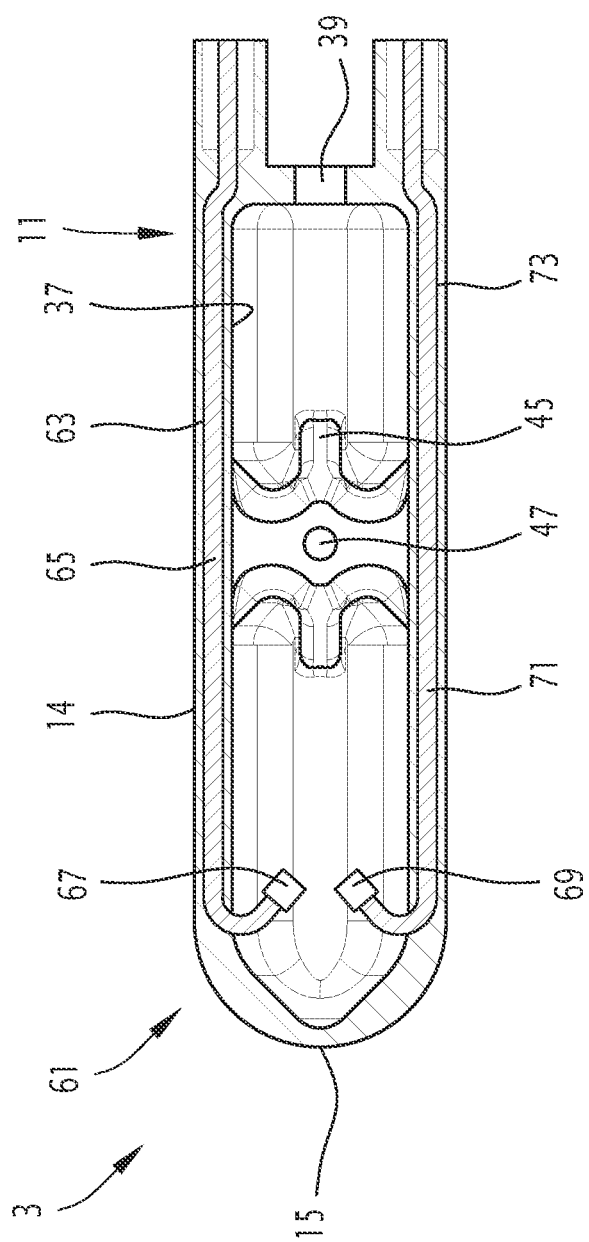
FIG. 7 is an axial cross-sectional view of the torch head of FIGS. 2 and 3, similar to FIG. 5, showing the inner instrumentation passage cavities and the inner protective gas passage cavity.

Preferably, the torch 1 comprises at least one sensor 69 carried by the body 11 and a signal transmission cable 71 connected to the sensor 69 (FIG. 7). The body 11 has an inner cavity 73 for passage of the signal transmission cable 71.

The sensor 69 is for example an additional lamp, a temperature probe or any other type of sensor.

The inner signal transmission cable cavity 73 is formed in the thickness of the outer wall 53.

The signal transmission cable 71 is configured to transmit the data acquired by the sensor 69 to a remote equipment, for example a digital processing unit.

The signal transmission cable 71, upon exiting the inner cavity 73, moves through the carrier 7 and then is connected to the remote equipment.

According to a variant, the torch 1 comprises a light source carried by the body 11 and a power supply cable connected to the light source. The body 11 then has an inner cavity for passage of the power supply cable.

The light source is typically provided for visualizing the working area of the torch 1.

The inner cavity for the passage of the power supply cable is formed in the thickness of the outer wall 53.

The power supply cable is configured to connect the light source to an electrical power source. The power supply cable, upon exiting the inner cavity, moves through the carrier 7 and then is connected to the power supply.

According to an alternative embodiment shown in FIG. 8, the body 11 has an inner cavity 75 through which the filler wire 17 and the insulating sheath 29 pass.

As before, the filler metal wire 17 flows through the insulating sheath 29 facilitating its unwinding and insulating it from electrical potential, from the base to the section 79. An outer motor drives it from a coil.

The inner cavity 75 for the passage of the filler wire 17 comprises a section 77 arranged in the thickness of the outer wall 53. This section 77 is extended by a section 79 projecting from the outer surface of the body and opening out at the edge of the diffusion opening 41. The orientation of this section 79 defines the angle of arrival of the filler metal wire 17 in the melt.

The wire guide 19 comprises a ceramic tip 81 attached to the body 11 as an extension of the inner cavity 75. This tip is hollow, and defines an inner passage for the filler metal wire 17.

The tip 81 extends the section 79 for a short length toward the tip 23 of the electrode 13. It forms, for example, a 45° angle with the electrode.

The tip 81 is, for example, removably attached to the end of the section 79, for example by screwing. The tip 81 is in fact a wear part, subject to the abrasion of the filler metal wire 17 in the same way as the sheath 29.

The filler metal wire 17 exiting the inner cavity 75 passes through the end cap 81 and emerges near the electrode 23, where it is consumed.

The or each inner cavity 63, 73, 75 is thus made directly in the material of the body 11. It is obtained in a simple and economical way because the body 11 is obtained by additive manufacturing.

The various parts obtained by additive manufacturing (body, sections, base, etc.) require very little reworking after printing. In the variant shown in FIGS. 2 and 3, it is necessary to carry out the threading intended to fix the tube 31 precisely. It may also be necessary to clean and correct the flatness of the electrical connection surfaces between the base 8, the carrier 7, the body 11 and the electrode 13.

The present disclosure also relates to a method for manufacturing a welding torch having the above features.

This method comprises a manufacturing step during which the body 11 is obtained by additive manufacturing from an electrically conductive metal.

This manufacturing step advantageously makes it possible to form in the body 11 one or more of the cavities from the list below:

inner cavity for the passage of the protective gas 37;
inner cavity for the passage of the cooling fluid 51;
inner cavity for the passage of the video observation system 61, if necessary;
inner passage cavity for the signal transmission cable 73 if applicable;
inner cavity for the passage of the power supply cable connected to the light source, if any;
inner cavity 75 for the passage of the insulating sheath and the filler wire, if any.

Preferably, the manufacturing step also forms the diffusion grid 43 together with the body 11.

The method typically comprises a second manufacturing step in which the carrier 7 is obtained by additive manufacturing from an electrically conductive metal, and/or a third manufacturing step in which the base 8 is obtained by additive manufacturing from an electrically conductive metal.

The present disclosure has multiple advantages.

It makes it possible to produce miniaturized welding torches, for example with a diameter of less than 20 mm, in which it is possible to implement one or more of the following functions: supply of the welding wire, supply of the gas protection, supply of the video, supply of the electrical power, cooling of the torch and installation of any measurement sensor necessary for controlling the welding method.

The object of the present disclosure is to produce welding torches of any three-dimensional geometry (for example, non-rectilinear and curved) with the aim of adapting to the real configuration of the assembly to be produced and to the constraints of the environment and available space.

The three-dimensional printing manufacturing technique makes it possible to model the material required for the welding operation in a short time and at a lower cost, according to the constraints of the application encountered and the problems to be solved.

In the example embodiments described above, the welding torch comprises a head 3 fixed to the base 8 by means of a carrier 7. Alternatively, the head 3 is integral with the base 8. In other words, it is directly linked to the base 8, without the interposition of a carrier.

Thus, the welding torch comprises in some cases several elements obtained by additive manufacturing from an electrically conductive metal. As described above, at least the body 11 of the head is obtained by additive manufacturing. In addition, one or more segments of the carrier 7 and/or the base 8 are advantageously obtained by additive manufacturing. According to one variant, these different elements are obtained separately by additive manufacturing and then assembled to each other. According to another variant, these different elements are obtained together, by a single additive manufacturing operation leading to the formation of a single part. These different elements are then integral.

What is claimed is:

1. A welding torch comprising:
   a head having a body bearing an electrode;
   a power supply having an electric power source; and
   a filler metal wire and a wire guide guiding the filler metal wire to the electrode,
   the body being obtained by additive manufacturing from an electrically conductive metal, the electrode being electrically connected to the electric power source by the electrically conductive metal constituting the body, the wire guide comprising an insulating sheath inside which the filler metal wire moves, the filler metal wire being electrically insulated from a potential of the body by the insulating sheath; and
   a carrier integral with the head, the carrier being obtained by additive manufacturing from an electrically conductive metal, the electrode being electrically connected to the electric power source through the metal constituting the carrier, the filler metal wire being electrically insulated from the potential of the carrier by the insulating sheath.

2. The welding torch according to claim 1, further comprising a base obtained by additive manufacturing from an electrically conductive metal, the electrode being electrically connected to the electric power source through the electrically conductive metal constituting the base, the carrier being integral with the base.

3. The welding torch according to claim 1, further comprising a base obtained by additive manufacturing from an electrically conductive metal, the electrode being electrically connected to the electric power source by the electrically conductive metal constituting the base, the head being integral with the base.

4. The welding torch according to claim 1, wherein the body comprises an inner cavity in which the filler metal wire and the insulating sheath pass.

5. The welding torch according to claim 4, wherein the wire guide comprises a ceramic tip attached to the body as an extension of the inner cavity.

6. The welding torch according to claim 1, wherein the wire guide comprises a tube located entirely outside the head, through which the filler wire and the insulating sheath pass.

7. The welding torch according to claim 1, further comprising a protective gas supply, the body comprising an inner protective gas passage cavity fluidly connected to the protective gas supply.

8. The welding torch according to claim 7, wherein the body comprises a protective gas diffusion opening around the electrode into which the inner protective gas passage cavity opens, the head comprising a diffusion grid extending into the protective gas diffusion opening and obtained by additive manufacturing together with the body.

9. The welding torch according to claim 1, wherein the torch comprises a cooling fluid supply, the body comprising an inner cooling fluid passage cavity fluidly connected to the cooling fluid supply.

10. The welding torch according to claim 9, further comprising a protective gas supply the body comprising an inner protective gas passage cavity fluidly connected to the protective gas supply, the inner protective gas passage cavity is completely enclosed in the body, the body comprising an outer wall internally delimiting the inner protective gas passage cavity and obtained by additive manufacturing of the electrically conductive metal, the inner cooling fluid passage cavity being formed within the thickness of the outer wall.

11. The welding torch according to claim 1, further comprising a video observation system, the body having an inner cavity for passage of the video observation system.

12. The welding torch according to claim 1, wherein the torch comprises at least one sensor carried by the body and a signal transmission cable connected to the sensor, the body having an inner signal transmission cable passage cavity.

13. A method for manufacturing the welding torch according to the claim 1, the method comprising:
   three-dimensional printing the body from the electrically conductive metal.

14. The welding torch according to claim 1, wherein the carrier is configured to be inserted into a duct and to allow the welding head to be placed in a work area inside the duct, the carrier having a shape of an elongated arm extending along a central axis of the duct.

15. The welding torch according to claim 2, wherein the carrier is configured to be inserted into a duct and to allow the welding head to be placed in a work area inside the duct, the carrier having the shape of an elongated arm extending along a central axis of the duct, an axial end of the carrier being connected to the base, the head being connected at another axial end of the carrier opposite the base, the base having perpendicularly to the central axis of the duct a much larger section than the carrier or the head, the base being designed to remain outside the duct.

16. A welding torch comprising:
   a head having a body bearing an electrode;
   a power supply having an electric power source; and
   a filler metal wire and a wire guide guiding the filler metal wire to the electrode,
   the body being obtained by additive manufacturing from an electrically conductive metal, the electrode being electrically connected to the electric power source by the electrically conductive metal constituting the body, the wire guide comprising an insulating sheath inside which the filler metal wire moves, the filler metal wire being electrically insulated from a potential of the body by the insulating sheath; and
   a protective gas supply, the body comprising an inner protective gas passage cavity fluidly connected to the protective gas supply.

* * * * *